United States Patent [19]

Chen et al.

[11] Patent Number: 5,214,641
[45] Date of Patent: May 25, 1993

[54] MIXED ANALOG DIGITAL SECONDARY CHANNEL FSK MODEM

[75] Inventors: Ching-Siang Chen; Bert White, both of Irvine, Calif.

[73] Assignee: Silicon Systems, Inc., Tustin, Calif.

[21] Appl. No.: 758,347

[22] Filed: Sep. 9, 1991

Related U.S. Application Data

[63] Continuation of Ser. No. 504,690, Apr. 4, 1990, abandoned, which is a continuation of Ser. No. 308,202, Feb. 8, 1989, abandoned.

[51] Int. Cl.[5] .................... H04J 1/00; H04L 27/32
[52] U.S. Cl. .................... 370/69.1; 370/121; 375/8; 375/17; 375/60; 375/91; 455/43
[58] Field of Search ............... 370/11, 12, 13, 69.1, 370/122, 125, 76, 110.1, 110.4, 119, 121; 375/1, 8, 10, 37, 38, 39, 42, 45, 50, 51, 60, 62, 88, 91, 17; 455/43, 60; 332/103, 120, 123

[56] References Cited

U.S. PATENT DOCUMENTS

| | | | |
|---|---|---|---|
| 3,868,599 | 2/1975 | Hirasaki et al. | 375/50 |
| 4,335,464 | 6/1982 | Armstrong | 370/69.1 |
| 4,366,572 | 12/1982 | Takatsuki et al. | 375/37 |
| 4,398,297 | 8/1983 | Hwang et al. | 375/10 |
| 4,471,312 | 9/1984 | Severin | 375/88 |
| 4,568,882 | 2/1986 | Single | 375/91 |
| 4,584,690 | 4/1986 | Cafiero et al. | 375/60 |
| 4,630,134 | 12/1986 | Kanamaru | 370/122 |
| 4,630,287 | 12/1986 | Armstrong | 375/39 |
| 4,694,471 | 9/1987 | Blesser | 375/45 |
| 4,787,094 | 11/1988 | Eguchi | 375/60 |
| 4,800,573 | 1/1989 | Cupo | 370/69.1 |
| 4,811,357 | 3/1989 | Betts et al. | 375/1 |

Primary Examiner—Douglas W. Olms
Assistant Examiner—Alpus H. Hsu
Attorney, Agent, or Firm—Hecker & Harriman

[57] ABSTRACT

A secondary channel FSK modem for use with primary channel QAM modems is described. The present invention is a fully integrated 75 bps narrowband secondary channel FSK modem which may be utilized with a primary channel QAM modem at data rates up to 19.2 kbps. The present invention applies switched capacitor circuits to implement band split filters and FSK transmitters. A micro-digital signal processor is implemented to realize the FSK receiver to achieve higher performance, long-term stability and versatility. The present invention provides 40 Hz separation of two carrier frequencies to improve bandwidth efficiency. In operation, an FSK modulator is combined with a highpass filter and delay equalizer to separate a section of the main channel bandwidth for use with the secondary channel. The FSK signal and QAM signal are then summed and provided to a smoothing filter for transmission line output. For receiving, an anti-alias filter recovers the received line signal and couples the signal to a highpass filter and bandpass filter. The highpass filter signal is delay equalized and coupled to a smoothing filter to obtain the main channel output. The bandpass filter is coupled through an A/D converter and to a micro-digital signal processor to recover the FSK data.

16 Claims, 8 Drawing Sheets

FUNCTIONAL BLOCK DIAGRAM

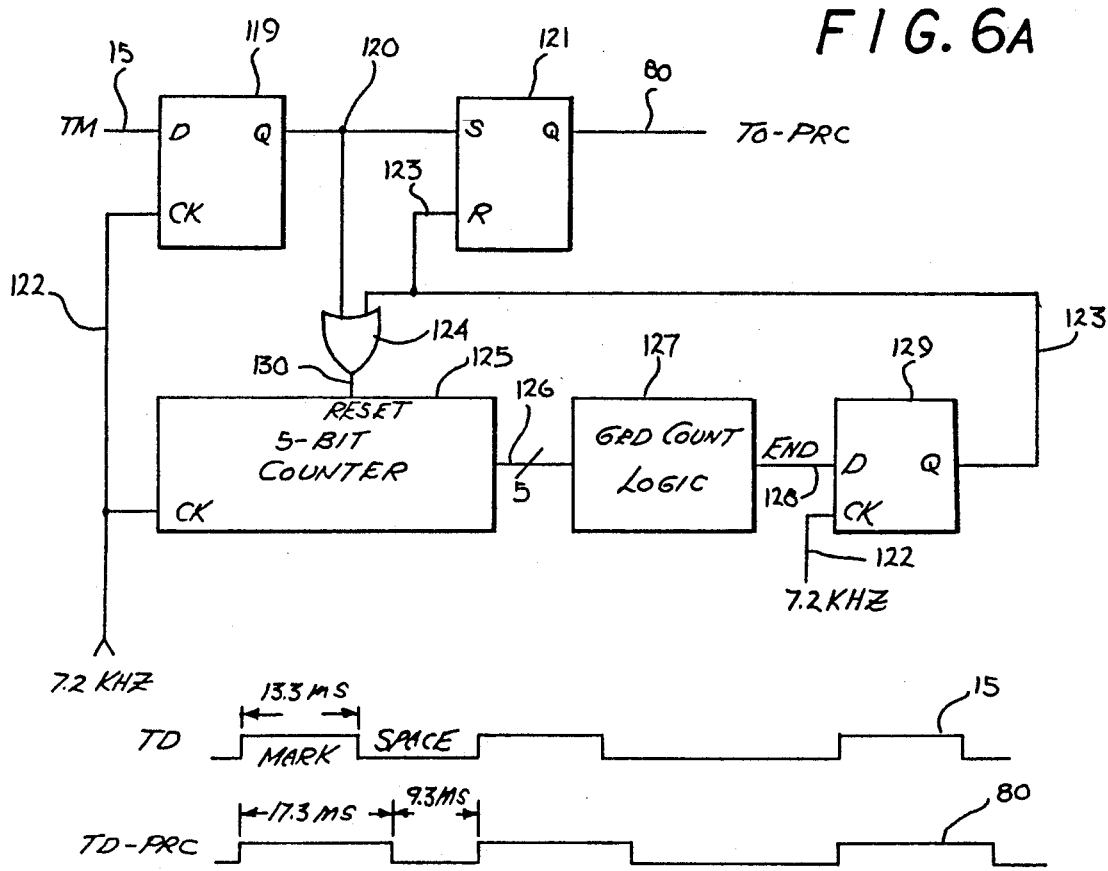
FIG. 6A
FIG. 6B
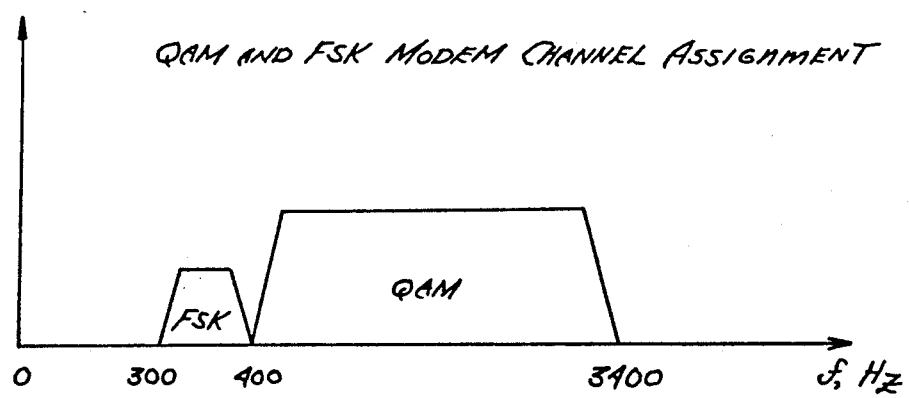
FIG. 7

MIXED ANALOG DIGITAL SECONDARY CHANNEL FSK MODEM

This is a continuation of application Ser. No. 504,690 filed Apr. 4, 1990, now abandoned, which is a continuation of Ser. No. 308,202 filed Feb. 8, 1989, now abandoned.

BACKGROUND OF THE PRESENT INVENTION

1. Field of the Invention

This invention relates to the field of data transmission and particularly to data transmission using a secondary channel FSK modem.

2. Background Art

Communication of data information on a voice network between a sending and receiving station is typically accomplished with a modem. A modem (modulator/demodulator) transforms digital information by modulating it according to a well known modulating scheme. This modulated data is transmitted to a receiving modem where it is demodulated to produce the original information.

There are several types of modulating schemes which may be utilized in digital transmission, such as frequency shift key (FSK), differential phase shift key (DPSK), quadrature amplitude modulation (QAM), etc.

For high-speed data transmission, dedicated unidirectional, half duplex modems are utilized. These modems are typically QAM modems with transmission rates of 9600 bps or greater, with large bandwidth overhead requirements. Although typically unidirectional, it is often desired to provide a secondary channel to provide information with the primary transmission. This secondary channel is typically an FSK-type transmission channel and is confined to a narrowband in the voice bandwidth. The transmission rate is substantially lower than the primary channel, often on the order of 5–110 bps.

In the prior art, a discrete secondary channel is often added to the primary QAM channel. A disadvantage of such discrete secondary channel FSK modems is high cost, poor performance and limited functions. For example, due to cost and board size limitations, the group delay equalization is not implemented with the band split filters. This results in substantial distortion to the QAM signal and degrades QAM modem performance to an unacceptable level for data rates over 9.6 kbps. In addition, the separating of two carrier frequencies in prior art FSK modems is on the order of 60 Hz. This requires a wider bandwidth for transmission, lowering efficiency of bandwidth utilization and prohibiting its use with 19.2 kbps QAM modems. Therefore, it is an object of the present invention to provide sufficient channel separation between QAM and FSK signals while generating minimum noise and distortion on the QAM signal.

It is another object of the present invention to provide a secondary channel FSK modem with separation of two carrier frequencies of 40 Hz.

It is yet another object of the present invention to provide a secondary channel FSK modem which constrains the FSK signal in a frequency band from 300 Hz to 400 Hz.

It is still another object of the present invention to provide a secondary channel FSK modem which facilitates a high-performance FSK detection, i.e., a bit-error rate of $10^{-5}$ is achieved with a 4 dB signal-to-noise ratio when the FSK signal is received at $-45$ dBm.

It is yet another object of the present invention to provide a fully integrated secondary channel FSK modem.

SUMMARY OF THE PRESENT INVENTION

A secondary channel FSK modem for use with primary channel QAM modems is described. The present invention is a fully integrated 75 bps narrowband secondary channel FSK modem which may be utilized with a primary channel QAM modem at data rates up to 19.2 kbps. The present invention applies switched capacitor circuits to implement band-split filters and FSK transmitters. A micro-digital signal processor is implemented to realize the FSK receiver to achieve higher performance, long-term stability and versatility. The present invention provides 40 Hz separation of two carrier frequencies to improve bandwidth efficiency.

To constrain the FSK signal in a narrowband from 300 Hz to 400 Hz, a modulation index of 0.53 is used, which allows only 40 Hz separation of two carrier frequencies for a 75 bps FSK transmission. This is an improvement over a conventional 75 bps FSK modem which requires a 60 Hz separation of two carrier frequencies, requiring a wider bandwidth for transmission and precluding its use with a 19.2 kbps QAM modem.

To provide sufficient channel separation between the QAM and FSK signals, a transmitter filter with a high Q is utilized for band-limiting the FSK signal. This high Q filter distorts the FSK signal and alters the duty cycle of the data bits. A precompensation circuit is used in front of the FSK transmitter to maintain equally-spaced data bits.

Each multiplier coefficient of digital filters realized with a micro-digital signal processor is stored in its signed digit representation and optimized for having no more than 3 non-zero bits.

The present invention applies a highpass filter to provide greater than 30 dB suppression on FSK signals and a delay equalizer, implemented with 6 bi-quads to equalize the group delay response to within ±100 microseconds from 600 Hz to 3400 Hz for the highpass filter. The topology and the realization sequence of transmission zeros in the highpass filter and the pairing and ordering of poles and zeros in the delay equalizer were arranged to minimize the wideband thermal noise generated in switched capacitor circuits.

A 45 dB gain stage is provided in front of the envelope detection to facilitate a fast carrier detection for FSK signals at $-45.0$ dBm.

In operation, an FSK modulator and lowpass filter is used to convert the secondary channel digital data into a band-limited FSK signal. The QAM signal is band-limited by a highpass filter with a delay equalizer to remove any residue energy within the FSK band. The FSK signal and QAM signal are then summed and provided to a smoothing filter for transmit line output. For receiving, an anti-alias filter band-limits the received line signal and couples the signal to a highpass filter and bandpass filter. The highpass filter signal is delay equalized and coupled to a smoothing filter to obtain the primary channel output. The bandpass filter is coupled through an A/D converter and to a micro-digital signal processor to recover the FSK data.

BRIEF DESCRIPTION OF THE DRAWINGS

FIG. 6a is a circuit diagram illustrating the precompensation circuit of the present invention.

FIG. 6b is a timing diagram illustrating the FSK data signal before and after precompensation.

FIG. 7 illustrates the QAM and FSK channel assignments of the present invention.

DETAILED DESCRIPTION OF THE PRESENT INVENTION

Figure 1:
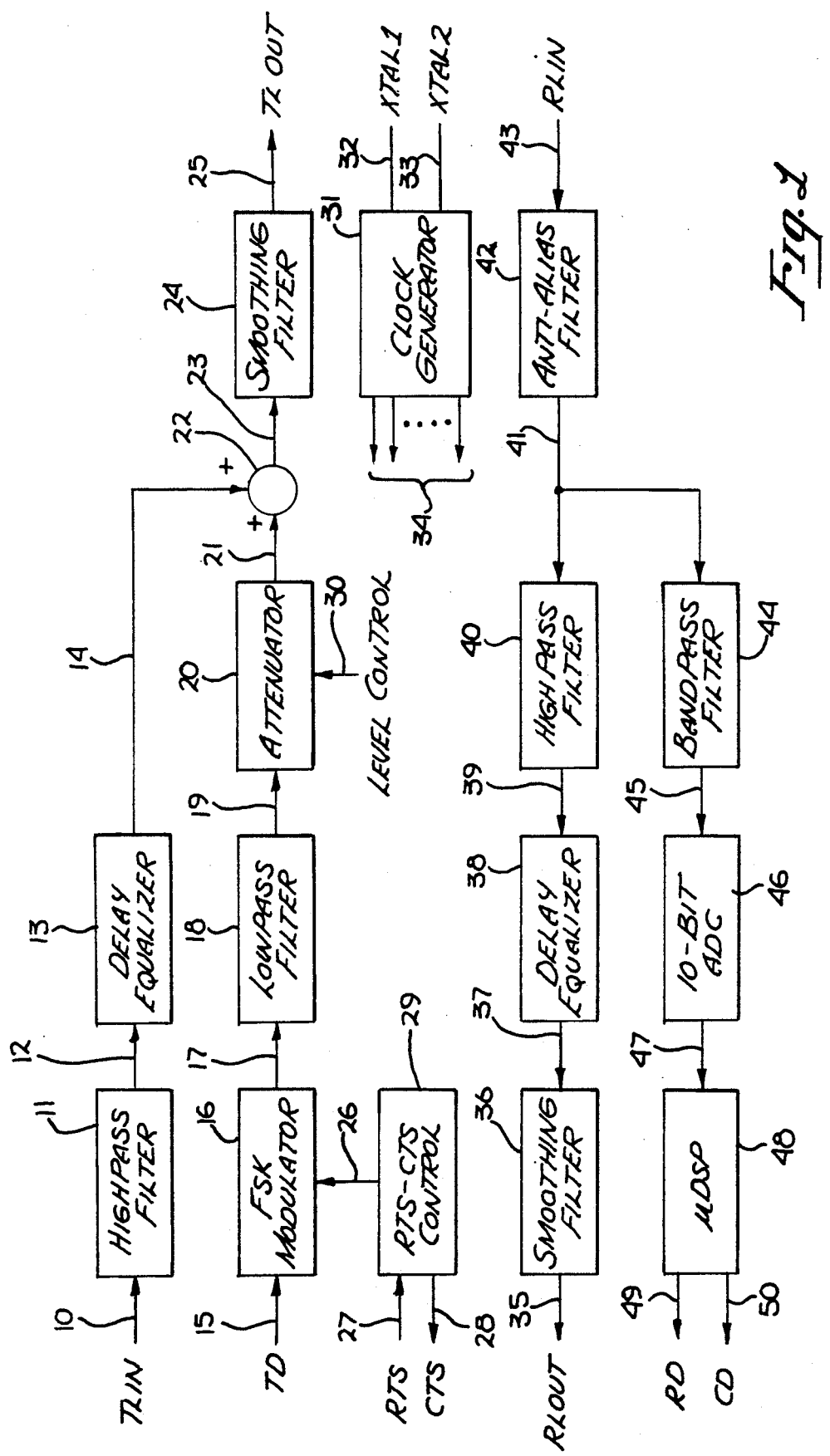
FIG. 1 comprises a block diagram of the secondary channel FSK modem of the present invention.

A secondary channel FSK modem, for use with a primary channel QAM modem, is described. In the following description, numerous specific details, such as number of poles, bandwidth, transmission rate, etc., are described in detail to provide a more thorough description of the present invention. It will be apparent, however, to one skilled in the art, that the present invention may be practiced without these specific details. In other instances well-known features have not been described in detail, so as not to obscure the present invention.

The preferred embodiment of the present invention provides a fully integrated secondary channel FSK modem. The present invention provides sufficient channel separation between the FSK and QAM signals with minimum noise and distortion introduced on the QAM signal. In the preferred embodiment, greater than 30 dB separation is provided between the FSK and QAM signals. The present invention constrains the FSK signal into a narrow, dispersed band from 300 to 400 Hz with a remaining voice band occupied by the QAM signal.

The secondary channel FSK modem of the present invention provides a filtering means for liberating a section of primary channel bandwidth. Modulating means are provided for modulating a signal for transmission in the liberated bandwidth. Combining means combine the first and second signals and output a 2-channel signal having a majority and a minority signal.

Receiving means receive the 2-channel signal and include filter means for extracting the high bandwidth of the majority signal. Second filter means are used for extracting the minority signal. Demodulating means are provided for retrieving the minority signal from the received 2-channel signal.

The preferred embodiment of the present invention utilizes a microdigital signal processor ($\mu$DSP) to implement the FSK demodulator instead of using a switched capacitor circuit. At the separation frequency contemplated by the present invention, high Q filters with low corner frequencies are required. Switched capacitor circuits are not suitable for such filter applications, due to DC offsets introduced by junction leakage currents. The $\mu$DSP of the present invention is constructed in a pipeline bit-slice architecture, which can be easily compiled or enhanced for different system applications.

The transmitter section of the present invention consists of a highpass filter with a delay equalizer to remove incoming energy in the incoming FSK band, an RTS/CTS timing sequencer to interface with DTE, and FSK modulator and lowpass filter to convert the digital data into a band-limited FSK signal, an attenuator to set the FSK signal level, a summer to add both QAM and FSK signals, and an RC-active lowpass filter to attenuate any clock-related aliases.

In the receiver section, an anti-alias lowpass filter band-limits the input signal. The resulting signal is then split into 2 paths. In the primary channel path, a highpass filter with a delay equalizer is followed by an RC-active lowpass filter. In the secondary channel path, a 10-bit A/D converter is followed by the $\mu$DSP which performs bandpass filtering, FSK demodulation, and signal level detect functions.

Figure 9:
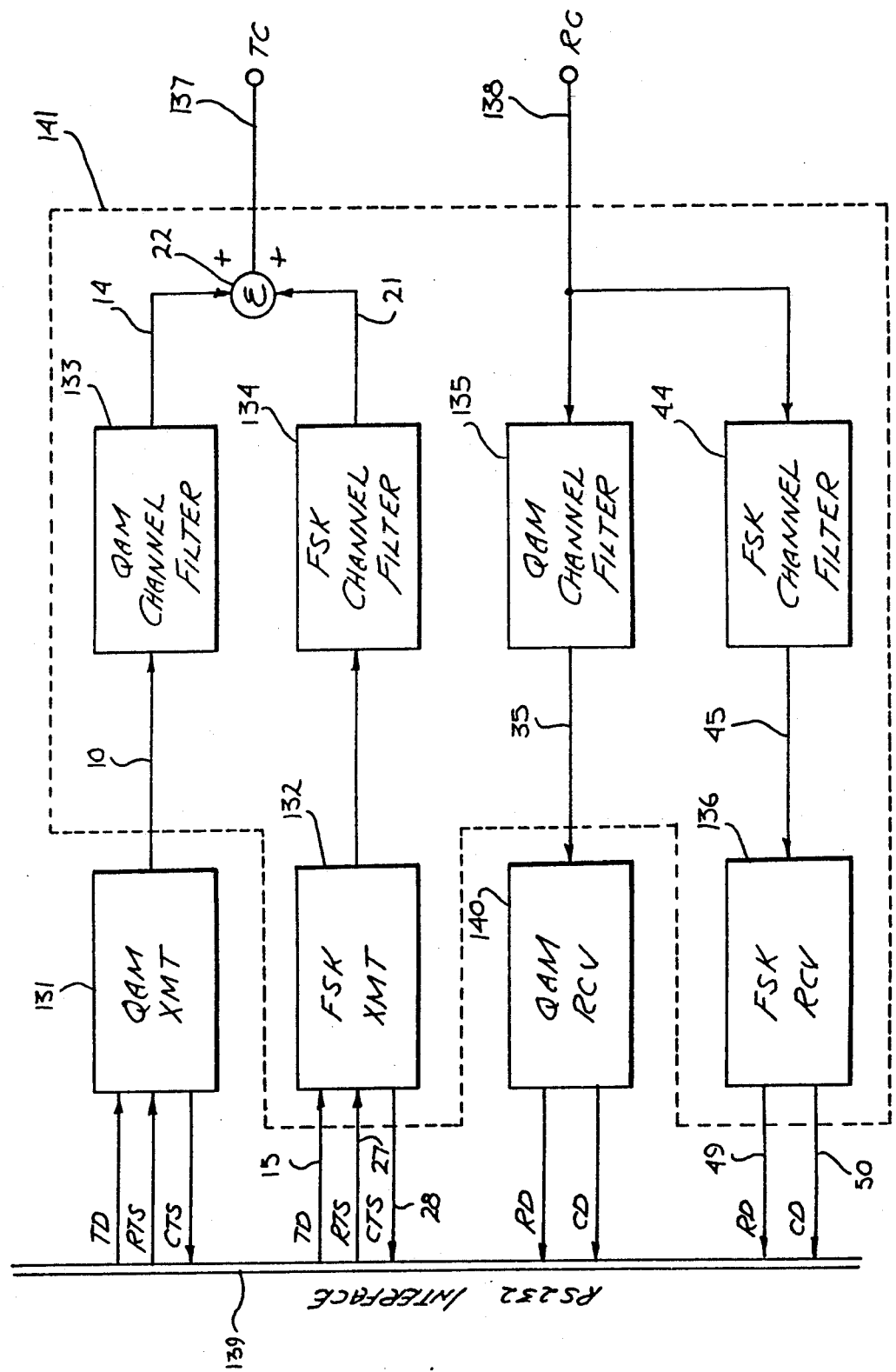
FIG. 9 is a block diagram of the preferred embodiment of the present invention.

The preferred embodiment of the present invention is illustrated in FIG. 9. The secondary channel FSK modem of the present invention is generally indicated by dashed line 141. The secondary channel FSK modem is coupled to the transmitter 131 and receiver 140 of a QAM modem. The QAM transmitter 131 is coupled to an RS232 interface 139 and receives the QAM data TD, the handshake RTS and provides an answer CTS signal to the RS232 interface. The QAM receiver 140 provides received data RD and carrier-detect signals CD to the RS232 interface.

The output 10 of the QAM transmitter 131 is coupled to a QAM channel filter 133 for defining the primary transmission channel. The output 14 of the QAM channel filter 133 is coupled to a summer 22. The FSK transmitter 132 receives FSK data BTD 15 and an BRTS signal 27 from the RS232 interface. The FSK transmitter 132 provides a BCTS signal 28 to the RS232 interface. The output 142 of the FSK transmitter 132 is provided to an FSK channel filter 134. The output 21 of the FSK channel filter 134 is coupled to summing node 22. The output 137 of the summing node 22 represents a two-channel signal, including the primary QAM channel and secondary FSK channel.

The received channel signal 138 is coupled to a QAM channel filter 135. The output 35 of the QAM channel filter is provided to the QAM receiver 140. The received channel signal 138 is also coupled to FSK channel filter 44 to separate the FSK channel from the QAM primary channel signal. The output 45 of FSK channel filter 44 is provided to FSK receiver 136. The FSK receiver 136 provides backchannel received data and backchannel carrier-detect signals 49 and 50, respectively, to the RS232 interface.

The channel assignment of the preferred embodiment of the present invention is illustrated in FIG. 7. The QAM signal is transmitted in the 400–3400 Hz bandwidth. The secondary channel FSK signal is constrained to the 300–400 Hz band. Utilizing the preferred embodiment of the present invention, only 40 Hz separation of the two carrier frequencies is required for a 75 BPS FSK transmission. This allows the present invention to be used with a 19.2 kbps QAM modem.

A block diagram illustrating the preferred embodiment of the present invention in detail is illustrated in FIG. 1. The transmission line 10 is coupled to a highpass filter 11. The output 12 of highpass filter 11 is coupled to a delay equalizer 13. BTD 15 is provided as an input to FSK modulator 16. The BTD signal 15 is a digital signal from an external source for transmitting to the secondary channel. The output 17 of FSK modulator 16 is coupled to lowpass filter 18 having an output 19 coupled to an attenuator 20. A level control 30 is inputted to attenuator 20. The output 21 of attenuator 20 is combined with the output 14 of delay equalizer 13 at summing node 22.

An RTS-CTS sequencer provides modem handshake for the secondary channel FSK. BRTS is used as an input to signify that DTE has data to transmit. BCTS is used as an output to signify DTE that communications have been established and the data can be transmitted.

The output 23 of summing node 22 is coupled to a smoothing filter 24 to provide a transmit line output 25.

A clock generator 31 utilizes master time base generated by an on-chip crystal oscillator with an external crystal applied at XTAL1 and XTAL2, 32 and 33 respectively, to provide a plurality of outputs 34 for providing the clocking of the secondary channel FSK modem.

The receiving line in signal 43 is coupled to an anti-alias filter 42. The output 41 of the anti-alias filter 42 is coupled to a highpass filter 40 and a bandpass filter 44. The output 39 of highpass filter 40 is coupled to delay equalizer 38. Delay equalizer 38 provides an output 37 to a smoothing filter 36 which generates the receive line output 35.

The bandpass filter 44 provides output 45 to 10-bit analog-to-digital converter 46. A 10-bit digital signal 47 is provided to the $\mu$DSP 48 which generates the backchannel receive FSK signal 49 and backchannel carrier-detect signal 50.

In operation, the highpass filter 11 and delay equalizer 13 remove incoming energy in the primary channel signal to create an available band for use with the secondary channel. The highpass filter 11 is used to remove low frequencies from the wide bandwidth input signal 10. However, this filter can also change the phase of the high frequency signals. In a QAM signal, the phase of the signal carries data information, so it is desired to correct the phase of the high frequency signals to their original state. The delay equalizer 13 is used to restore the phase of the high frequency signal to its original state.

When an external source wishes to utilize the secondary channel, a backchannel request-to-send (BRTS) signal 27 is provided to the RTS-CTS control 29. The RTS-CTS control 29 responds with a backchannel clear-to-send (CTS) signal 28 and outputs an enabling signal 26 to the FSK modulator 16. The secondary channel data is then coupled through the FSK modulator 16, lowpass filtered at filter 18, and coupled to attenuator 20. The attenuator sets the FSK signal level under the command of level control 30. The level control is an external user-selected signal to provide gain to the lowpass filter signal. Typically, the secondary channel signal is approximately 6 dB lower than the primary channel signal. Therefore, a user may desire to adjust the gain of the secondary channel signal according to the transmitting level of the primary channel QAM signal.

The FSK signal 21 and QAM primary channel signal 14 are then summed and coupled to smoothing filter 24. This smoothing filter is an RC-active, lowpass filter to attenuate any clock-related aliases.

when receiving a combined primary channel and secondary channel signal, the signal 43 is coupled to an anti-alias filter to band-limit the input signal. This band-limited signal 41 is coupled in 2 paths to the primary channel and FSK channel, respectively. The primary channel signal is highpass filtered at filter 40 by delay equalization and a smoothing filter to produce the receive primary channel signal 35. In the FSK loop, the signal 41 is bandpass filtered and coupled to a 10-bit A/D converter. The output 47 of the ADC is coupled to the micro-digital signal processor 48 to implement the FSK demodulation and signal level detect functions.

Figure 8:
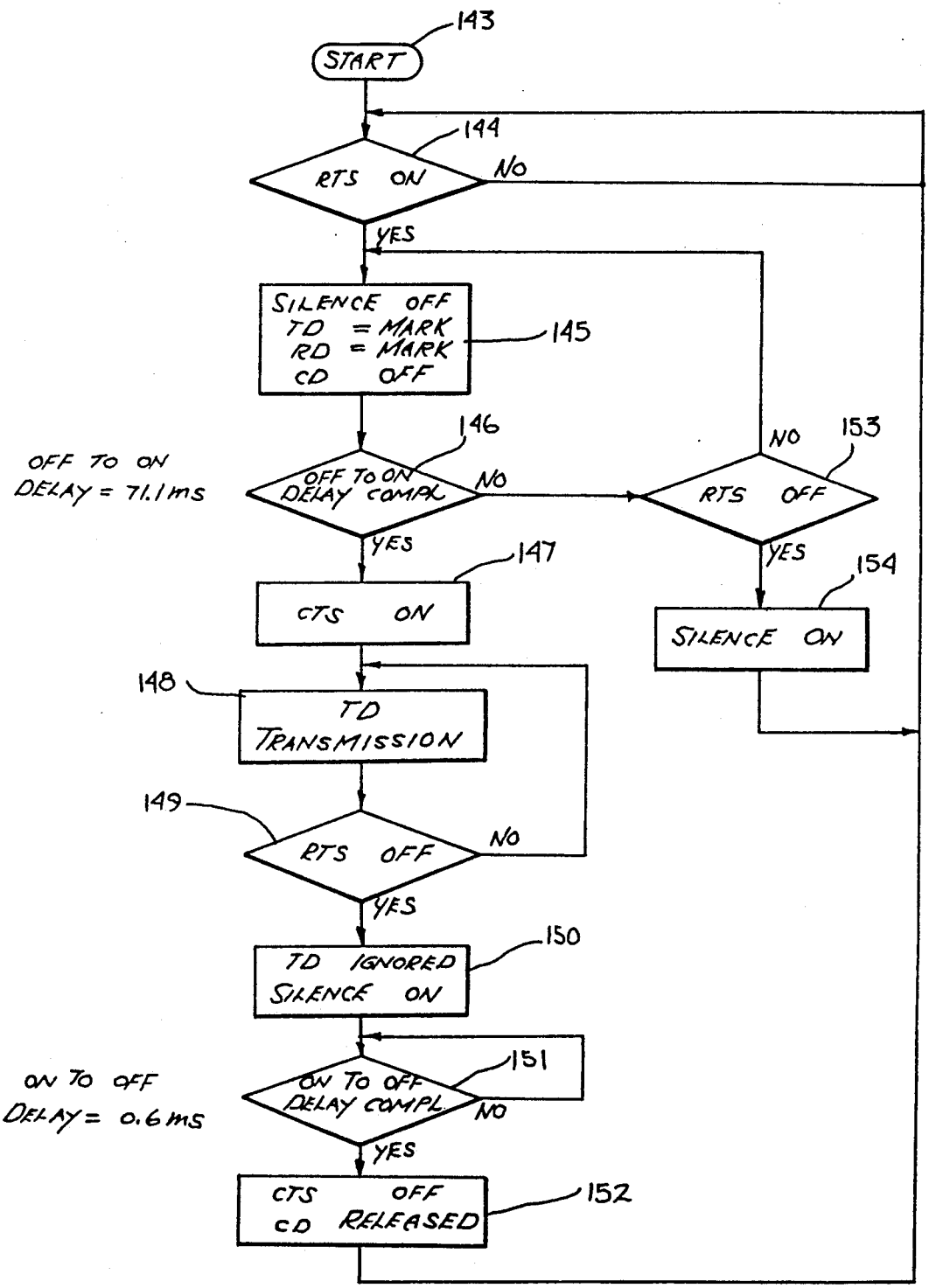
FIG. 8 is a flow chart illustrating the operation sequence of the present invention.

The secondary channel's transmit-state diagram is illustrated in FIG. 8. At start 143, the FSK modem checks to see if the BRTS line is high at decision block 144. If the BRTS signal is not on, the modem stays in the waiting mode. If the BRTS signal is on, the modem turns Silence Off at block 145, sets the transmission data line 15 to mark, sets the backchannel receive data line 49 to mark and turns off the backchannel carrier-detect line 50. The modem then holds this state for a delay of 71.1 milliseconds. At decision block 146, the modem checks to see if the off to on delay has been completed. If the delay is not complete, the modem checks to see if the BRTS signal has been turned off at decision block 153. If the BRTS signal has not been turned off, the modem returns to block 145. If the BRTS signal has been turned off, the modem goes back to the silent mode at block 154 and returns to its waiting state.

When the off to on delay is complete, the modem turns the BCTS signal 28 on at block 147. The modem then begins to transmit data at block 148. During transmission, the modem check to see if the BCTS signal has been turned off at decision block 149. If the BRTS signal has not been turned off, the modem continues transmitting. If the BRTS signal has been turned off, the transmit data signal 115 is ignored and Silence is turned on at block 150. An on-to-off delay of 0.6 milliseconds is implemented, and this delay is checked at decision block 151. If the delay is not complete, the modem simply waits. If the delay is complete, the modem turns the BCTS signal 28 off, releases the backchannel carrier-detect signal at block 152 and returns to its waiting state.

Figure 2:
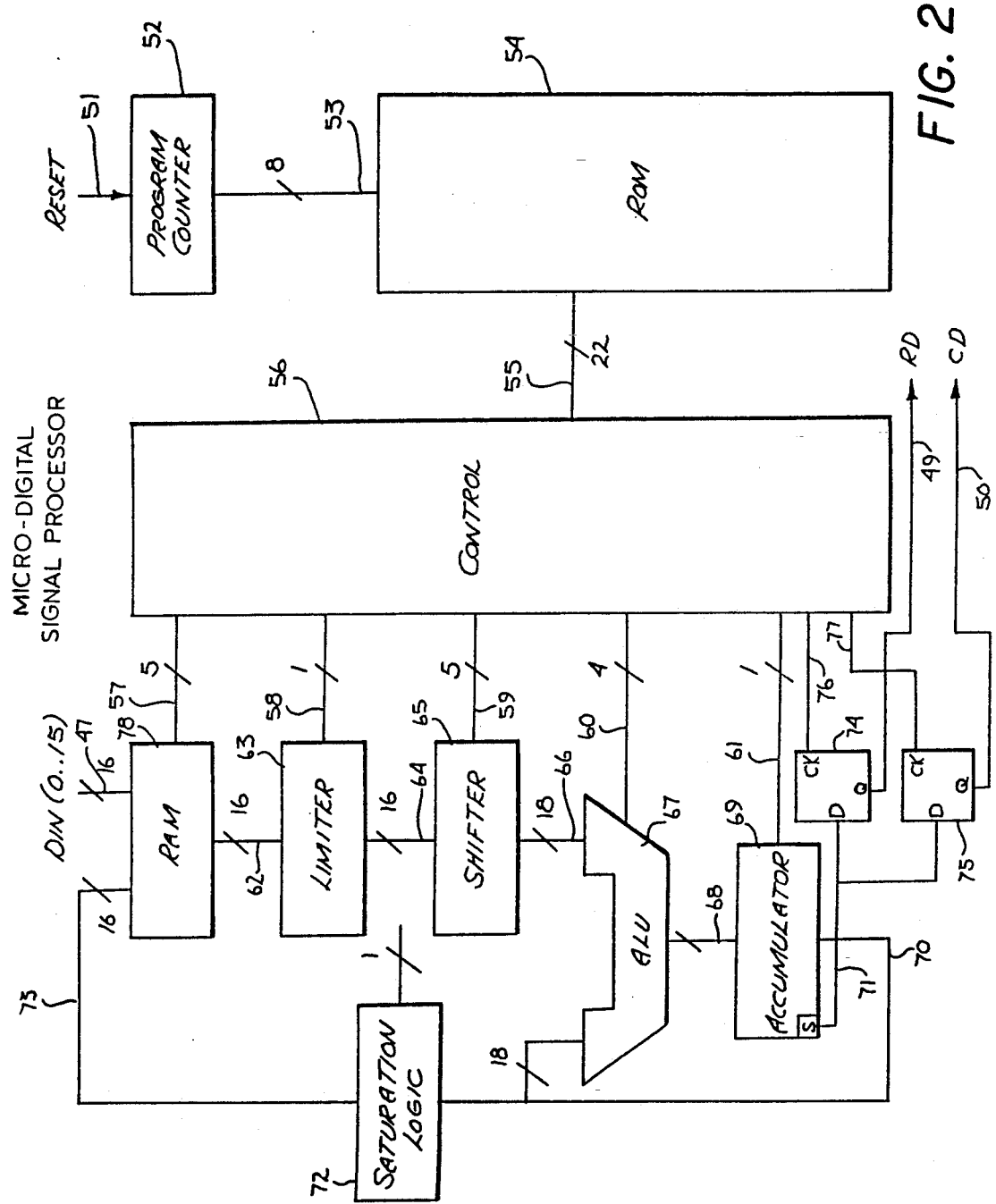
FIG. 2 is a block diagram of the micro-digital signal processor of the present invention.

The micro-digital signal processor of the present invention is illustrated in FIG. 2. The $\mu$DSP is constructed in a pipeline bit-slice architecture which can be easily compiled or enhanced for different system applications. Referring to FIG. 2, program counter 52, controlled by reset signal 51, outputs an 8-bit program count 53 to ROM storage 54. The output 55 of ROM 54 is coupled to control means 56. The control means provides a plurality of outputs 57-61 to arithmetic elements of the $\mu$DSP. The output 57 in the preferred embodiment of the present invention is a 5-bit output coupled to RAM 78. The RAM 78 receives the digital output 47 of 10-bit ADC 46 (see FIG. 1).

The RAM 78 provides an output 62 to limiter 63. The control block 56 provides a 1-bit control signal 58 to limiter 63. Limiter 63 provides an output 64 to shifter 65. The control block 56 provides a 5-bit control signal 59 to shifter 65. One bit controls shift direction, either towards MSB or LSB. The remaining four bits control the number of shift places, from 0 to 15.

Output 66 of shifter 65 is provided as one input to the arithmetic logic unit (ALU) 67. The control block 56 provides a 4-bit control code 60 to the ALU 67. The output 68 of the ALU 67 is coupled to accumulator 69. The output 70 of the accumulator 69 is coupled to the other input of ALU 67 and to saturation logic unit 72. The output 73 of saturation logic unit 72 is coupled as an input to RAM 78.

The "S" output 71 (sign output) of accumulator 69 is coupled as input to D-type flipflops 74 and 75, respectively. A positive output of accumulator 69 represents mark in the FSK scheme while a negative sign represents space. Control block 56 provides clock signal 76 and 77 to flipflops 74 and 75, respectively. Flipflop 74 provides the received data signal 49 and flipflop 75 provides the carrier-detect signal 50.

In the preferred embodiment of the present invention, the $\mu$DSP is optimized for recursive digital filtering with 176 words of ROM, 32 words of RAM, a limiter, a barrel shifter, an 18-bit ALU and accumulator and saturation logic. Multiplication is accomplished with a number of shift-and-adds, depending upon the number of non-zero bits in the signed digit representation of the multiplier. Domino logic is employed extensively to achieve small silicon area, low switching noise and high speed demanded by the $\mu$DSP.

Each multiplier coefficient is optimized for having fewer than three non-zero bits in its signal-digit representation. With this technique, the $\mu$DSP effectively executes 17 poles of filtering in the FSK receiver. The digital filters are realized with low sensitivity, LDI ladder structures to minimize the effect of multiplier coefficient quantization on the filter frequency response. Less than ±0.02 dB error on the passband ripple of the fourth order elliptic bandpass ladder filter is achieved.

A key analog element included on the device is a seventh order elliptic highpass ladder filter, with a twelfth order delay equalizer. The highpass filter provides greater than 30-dB suppression on the FSK signal. The delay equalizer, implemented with 6 bi-quads, equalizes the group delay response to within ±100 microseconds from 0.6 kHz to 3.4 kHz for the highpass filter.

Figure 3:
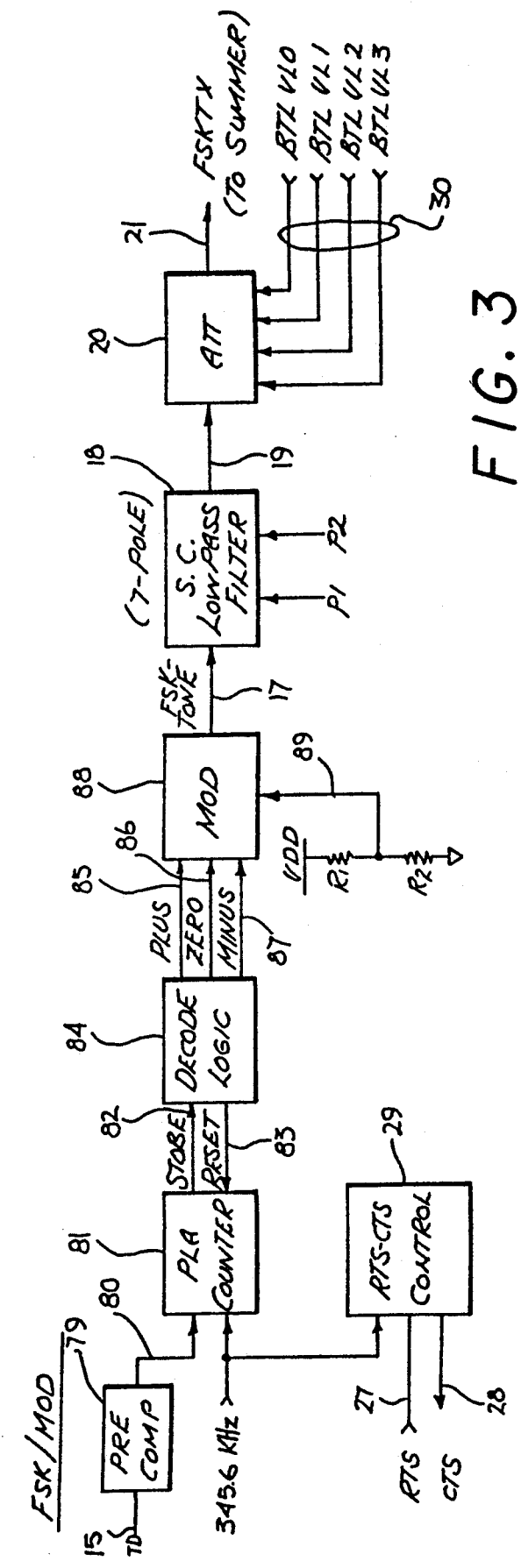
FIG. 3 is a block diagram of the FSK modulator of the present invention.

The FSK modulator 16 of FIG. 1 is illustrated in detail in FIG. 3. At the frequencies and baud rate of the preferred embodiment of the present invention, an asymmetrical FSK pulse may be generated. That is, the space may be stretched so that it is longer than the mark. Therefore, the FSK pulse 15 is coupled to a precompensation circuit 79 to even out the rising and falling edge of the pulse, shrinking the space and stretching the mark. This results in an equal mark/space duty cycle for the receiver. The output 80 of the precompensator 79 is coupled to a PLA counter 81 along with a clock signal 90. The PLA counter 81 provides a strobe signal 82 to decode logic 84. A reset signal 83 is provided from decode logic 84 to PLA counter 81.

The decode logic 84 outputs plus, zero and minus signals 85, 86, and 87, respectively to modulator 88. Voltage VDD is coupled through resistor R1 and R2 to ground and node 89 between resistors R1 and R2 is coupled to modulator 88. Modulator 88 provides FSK tone output 17 to a 7-pole lowpass filter 18. Signals P1 and P2 control lowpass filter 18. The output 19 of lowpass filter 18 is provided to attenuator 20 along with control signals 30. The output 21 of attenuator 20 is provided to the summing node 22 (see FIG. 1).

Figure 3A:
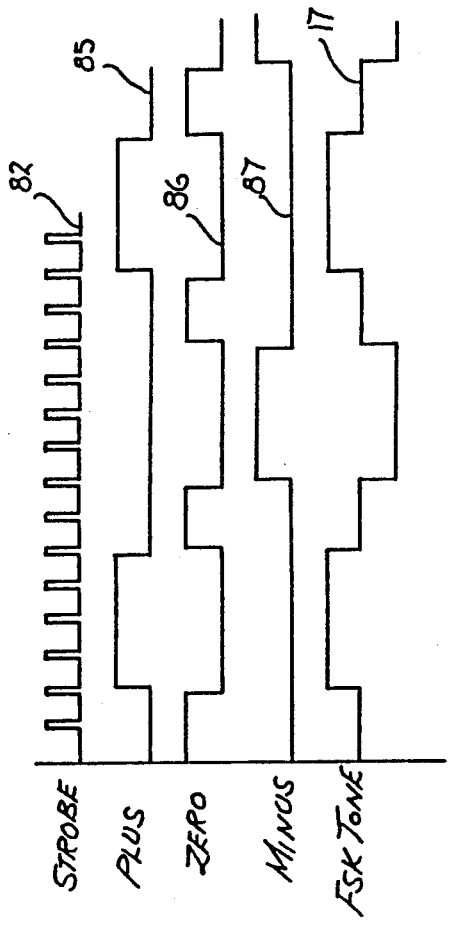
FIG. 3(a) is a timing diagram of certain signals of FIG. 3.

The timing signals for the various signals of the FSK modulator are illustrated in FIG. 3(a). The strobe signal 82 is approximately 12 times the tone frequency.

The precompensation circuit 79 is shown in detail in FIG. 6a. The FSK BTD data 15 is provided as an input to D-type flipflop 119. The output 120 of flipflop 119 is provided to the set input of RS flipflop 121. The output 120 is also coupled as one input to OR gate 124. The output 130 of OR gate 124 is coupled to the reset input of counter 125. The counter 125 is a 5-bit counter in the preferred embodiment of the present invention. A 7.2 kHz clock signal provides clocking to counter 125 and flipflop 119.

The counter output 126 is coupled to end count logic 127. Logic 127 provides an END signal 128 to D-type flipflop 129. Flipflop 129 is also clocked by clocking signal 122. The output 123 of flipflop 129 is coupled to the other input of OR gate 124 into the reset input of flipflop 121. The flipflop 121 provides a compensated output 80.

In operation, the FSK data is first synchronized with the D-type flipflop 119, clocked at 7.2 kHz. The synchronized data 120 is provided as the set input to the RS flipflop 121. The counter is clocked at 7.2 kHz as well, and resets whenever the synchronized data 120 is a mark ("1"), or the counter reaches a preselected end count. In the latter case, the flipflop 121 will be reset to space ("0"). With this technique, a mark signal is stretched by a prespecified amount of time and a space is shrunk by the same amount of time.

Referring to FIG. 6b, the uncompensated transmit data signal 15 has equal duty cycles for mark and space. In the preferred embodiment of the present invention, the mark is 13.3 milliseconds in length. After the precompensation circuit, the output 80 has a mark which is approximately 17.3 milliseconds in length and a space which is 9.3 milliseconds in length. The nature of the subsequent filtering of the present invention is such that the space will be stretched and the mark shrunk. However, by precompensating with a longer mark, the end result is an equal duty cycle for mark and space for the receive channel.

Figure 4:
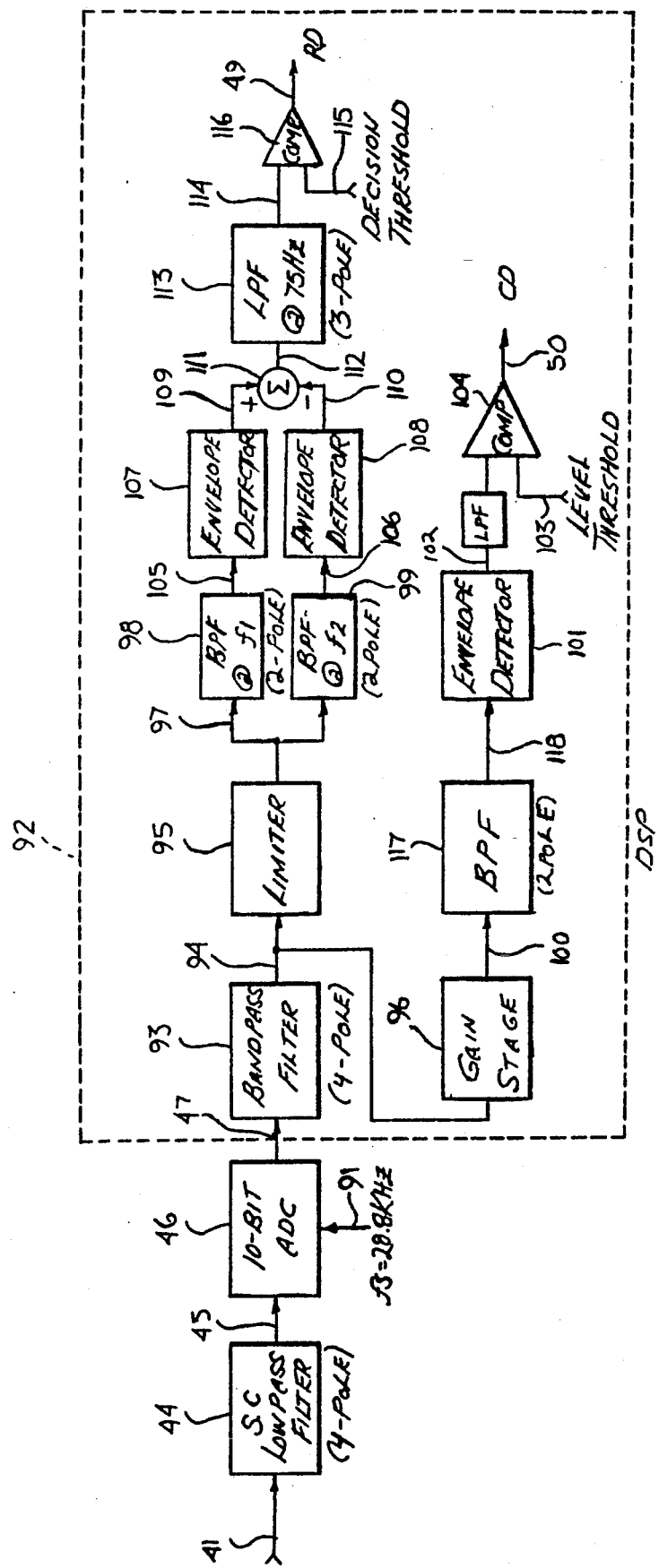
FIG. 4 is a functional block diagram of an FSK demodulator of the present invention.

A functional block diagram illustrating the FSK demodulator implemented by the micro-digital signal processor is illustrated in FIG. 4. The demodulator is indicated generally by the dashed line 92. The receive signal 41, having passed through the anti-alias filter, is provided to the bandpass filter 44 to band-limit the FSK secondary channel. The output 45 of the filter 44 is converted into the digital domain at analog-to-digital converter 46. This digital value 47 is then provided to the demodulator 92. The $\mu$DSP implements a bandpass filter 93 which, in preferred embodiment, is a 4-pole filter. The output 94 of filter 93 is provided to the data detect and carrier detect channels, respectively. In the data detect channel, the signal 94 is provided to a limiter 95 which converts the signal to a plus or minus full-scale signal.

This full-scale signal 97 is then provided to bandpass filter 98 to detect mark and bandpass filter 99 to detect space. The output 105 of filter 98 is coupled to envelope detector 107 to convert the energy to DC values. The output 109 of envelope detector 107 represents the mark energy. The output 106 of filter 99 is coupled to envelope detector 108 to convert the space energy to DC value. The output 110 of envelope detector 108 is coupled to summing node 111 along with the output 109 of envelope detector 107. If there is greater positive energy, a mark is detected on output line 112. If there is greater negative energy, a space is detected on output line 112.

The output 112 is coupled to a 3-pole lowpass filter 113 to smooth out any noise introduced by the carrier energy. The output 114 of the filter 113 is coupled to comparator 116 where it is compared to a threshold value (typically zero), with a small amount of hysteresis, to determine if a mark or a space is detected.

The output 94 of filter 93 is also coupled to a second path to determine carrier detect. A gain stage 96 is used to amplify the signal 94 to shorten detection time. The output 100 of gain stage 96 is coupled to a bandpass filter 117 to detect the carrier energy. The output 118 of bandpass filter 117 is coupled to envelope detector 101 to convert the carrier detect energy to a DC value. This DC value 102 is coupled through a 3 pole lowpass filter 154 to comparator 104 where it is compared to a threshold level 103 with a hysteresis of 2 dB. If the energy exceeds the threshold level 103, a carrier detect signal is provided on output 50.

Figure 5:
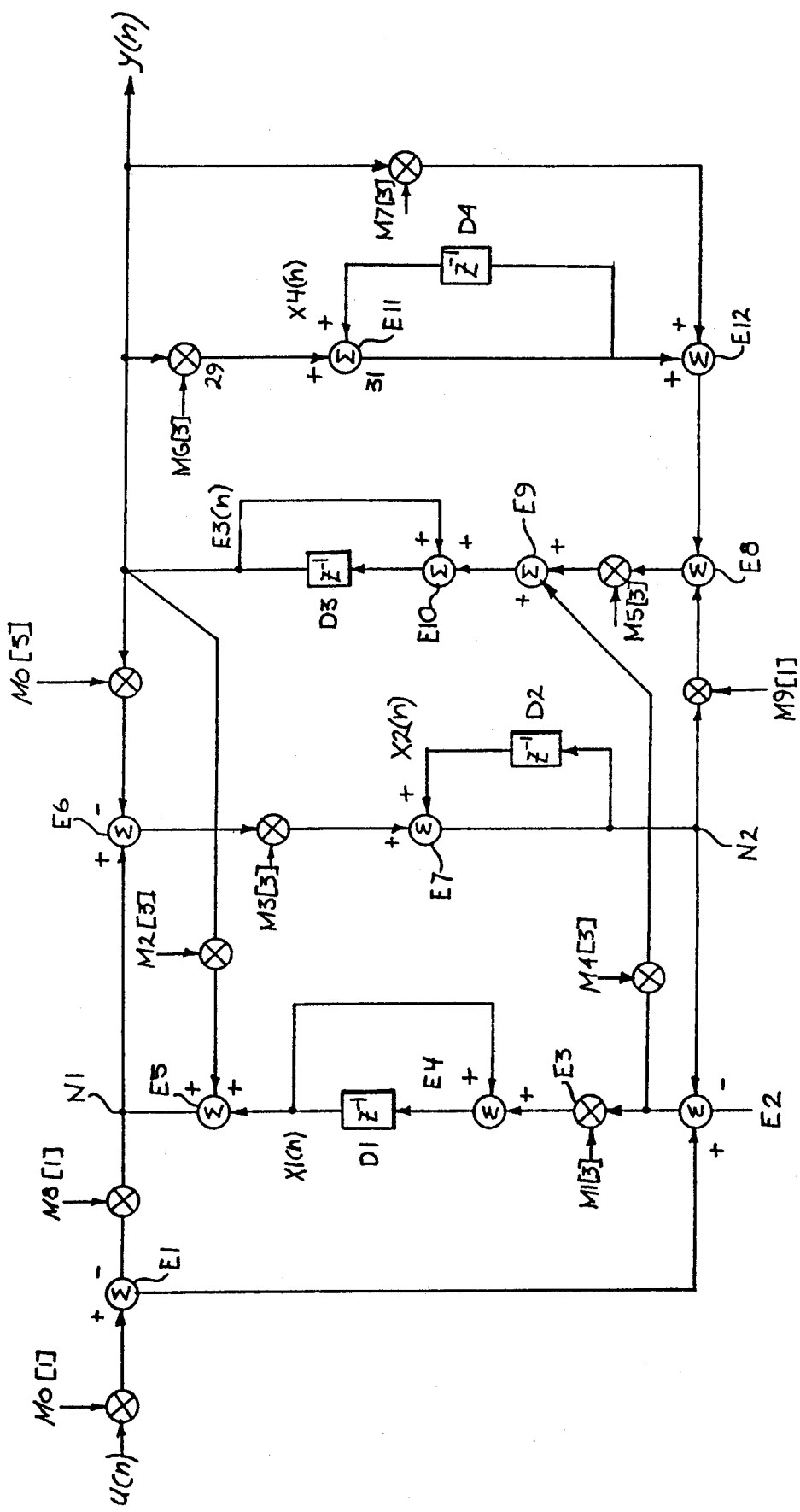
FIG. 5 is a state diagram of a filter of the present invention.

The filter 93 at FIG. 4 is shown in detail in FIG. 5. The filter is a 4-pole filter, and FIG. 5 illustrates the state calculations for the four state variables at X1, X2, X3 and X4 as well as the output state Y(n). The filter coefficients are implemented such that the greatest number of non-zero bits is 3. This permits the filter to be implemented with a simple shift-and-add operation, simplifying the μDSP programming while still providing precision filtering capabilities. The coefficients, $M_0$–$M_{10}$ include a bracketed number showing the number of non-zero bits associated with each coefficient. The actual coefficients are as follows:

$M0 = 2^{-2}$
$M1 = 2^{-4} - 2^{-7} + 2^{-4}$
$M2 = 2^{-4} + 2^{-7} + 2^{-13}$
$M3 = 2^{-3} + 2^{-9} + 2^{-14}$
$M4 = 2^{-6} + 2^{-8} - 2^{-11}$
$M5 = 2^{-4} + 2^{-5} + 2^{-7}$
$M6 = 2^{-4} - 2^{-8} - 2^{-12}$
$M7 = 2^{-3} + 2^{-6} - 2^{-9}$
$M8 = 2^{-2}$
$M9 = 2^{-1}$
$M10 = 2^{-3} + 2^{-4} + 2^{-8}$

FIG. 5 can be described mathematically by the following equations illustrating the solutions for the next state, (n+1) at each pole of the filter as well as the calculation of the next output value Y (n+1).

$$X1(n+1) = X1(n) + M1\{X2(n+1) + M0^*U(n) - M8[X1(n) + M2^*X3(n)]\}$$

$$X2(n+1) = X2(n) + M3\{M10^*X3(n) - [X1(n) + M2^*X3(n)]\}$$

$$X3(n+1) = X3(n) + M4\{X2(n+1) + M0^*U(n) - M8[X1(n) + M2^*X3(n)]\}$$

$$- M5\{M9^*X2(n+1) + [X4(n+1) + M7^*X3(n)]\}$$

$$X4(n+1) = X4(n) + M6^*X3(n)$$

$$Y(n+1) = X3(n+1)$$

The product of the U(n) signal and the coefficient M0 is provided to summing node E1. The output of summing node E1 is coupled to summing node E2. The output of summing node E2 is multiplied by coefficient M1 and the product is provided to summing node E4. The output of summing node E2 is also multiplied by coefficient M4 and that product is provided to summing node E9.

The output of summing node E4 is coupled through delay D1 to produce the value X1. X1 is coupled in a feedback loop to summing node E4 and also to summing node E5.

The output of summing node E5 is multiplied by coefficient M8 and the product is provided to summing node E1. The output of summing node E5 is also provided as an input to summing node E6. The output of summing node E6 is multiplied by coefficient M3 in the product provided as an input to summing node E7. The output of summing node E7 is coupled through a delay D2 in a feedback loop to the other input of summing node E7. This value is the X2 value referred to above. The output of summing node E7 is also coupled at node N2 to summing node E2 and is multiplied by coefficient M9 with the product being provided as an input to summing node E8. The output of summing node E8 is multiplied by coefficient M5 and the product is provided to summing node E9. The output of summing node E9 is coupled to summing node E10.

The output of summing node E10 is coupled in a feedback loop through delay D3 to the summing node E10. The output of the delay D3 is the value X3. This value X3 is multiplied by coefficient M2 and the product is provided to summing node E5. The value X3 is also multiplied by coefficient M10 and the product is provided to summing node E6.

The value X3 (n), which is equal to the output Y (n) is multiplied by coefficient M6 and the product is provided to summing node E11. The output of summing node E11 is coupled to summing node E12 and in a feedback loop through delay D4 to summing node E11. This value is the X4 value. The output Y (n) is multiplied by coefficient M7 and the product is provided to summing node E12.

By implementing filters having coefficients with a maximum number of three non-zero bits in the coefficients, a shift-and-add may be used to implement multiplication, simplifying the digital signal processing of the present invention and reducing the number of code lines required.

Thus, a secondary channel FSK modem is described.

We claim:

1. A secondary channel modem comprising:
   first filter means coupled to a first input signal for defining a first channel for transmitting said first input signal, said first filter means providing a first output signal;
   equalizing means coupled to said first output signal for providing a first channel signal;
   modulating means coupled to a second input signal for defining a second channel for transmitting said second input signal, said modulating means providing a second output signal, said second channel being asynchronous in transmission rate to said first channel;
   level control means coupled to said second output signal for controlling the amplitude of said second output signal and providing a second channel signal;
   combining means coupled to said equalizing means and said level control means for combining said first and second signals and providing a two-channel signal;
   receiving means for receiving a two-channel signal, said receiving means including second filter means for recovering said first channel signal and third filter means for recovering said second channel signal;
   demodulating means coupled to said third filter means for converting said second channel signal to a received signal.

2. The modem of claim 1 wherein said modulating means is an FSK modulator.

3. The modem of claim 2 wherein said combining means comprises a summer.

4. The modem of claim 3 wherein said demodulating means comprises a digital signal processor.

5. The modem of claim 4 further including analog-to-digital converting means coupled to said third filter means for converting said third channel signal to a digital signal and providing said digital signal to said digital signal processor.

6. The modem of claim 5 wherein said first channel signal comprises a quadrature amplitude modulation (QAM) signal.

7. The modem of claim 6 wherein said demodulating means further detects carrier energy.

8. A secondary channel FSK modem comprising:
first filter means coupled to an input QAM signal for defining a first channel and providing a first output signal;
delay equalizing means coupled to said first filter means for phase correcting said first output signal and providing a first channel signal;
modulating means for converting a digital input signal to an FSK signal;
second filter means coupled to said FSK signal for defining a second channel and providing a second output signal, said input FSK signal related to said input QAM signal, said second channel being asynchronous in transmission rate to said first channel;
gain control means coupled to said second output signal for controlling the amplitude level of said second output signal and providing a second channel signal;
summing means coupled to said first and second channel signals for combining said first and second channel signals and providing a two channel output signal;
receiving means coupled to a two channel output signal having third filter means for separating said first channel signal and fourth filter means for separating said second channel signal;
demodulating means coupled to said second channel signal for converting said second channel signal to a received signal and a carrier detect signal.

9. The modem of claim 8 wherein said demodulating means comprises;
a fifth filter means coupled to said second channel signal for detecting mark energy;
a first converting means coupled to said fifth filter means for converting mark energy to a first DC value;
a sixth filter means coupled to said second channel signal for detecting space energy;
a second converting means coupled to said sixth filter means for converting space energy to a second DC value;
a summing node coupled to said first and second DC values, said summing node providing a positive output when said first DC value is greater than said second DC value and a providing a negative output when said second DC value is greater than said first DC value;
output means coupled to said summing node for providing a mark detect signal when said summing node provides a positive output and a space detect signal when said summing node provides a negative output.

10. The modem of claim 9 wherein said demodulating means is implemented as a digital signal processor.

11. The modem of claim 10 wherein said gain control means comprises an attenuator.

12. The modem of claim 11 further including precompensation means coupled to said digital input signal to lengthen a mark signal of said digital input signal.

13. The modem of claim 12 wherein said precompensation means comprises a first flipflop for receiving said digital input signal, detecting means coupled to said first flipflop for detecting said mark signal, counting means coupled to said detecting means for outputting a count signal for a specified period of time, a second flipflop coupled to said count signal and said first flipflop, said second flip flop providing a mark output when said count signal is provided.

14. The modem of claim 13 wherein said output means comprises a comparator coupled to said summing node to a threshold value having an amount of hysteresis.

15. A secondary channel modem comprising:
first filter means coupled to a first input signal for defining a first channel for transmitting said first input signal, said filter means providing a first output signal;
modulating means coupled to a second input signal for defining a second channel for transmitting said second input signal, said modulating means converting said second input signal to a second output signal, said second channel being asynchronous in transmission rate to said first channel, said modulating means comprising an FSK modulator;
combining means coupled to said first filter means and said modulating means for combining said first and second output signals, said combining means comprising a summer for providing a two-channel signal;
receiving means for receiving a two channel signal, said receiving means including second filter means for separating said first channel and third filter means for separating said second channel;
demodulating means coupled to said third filter means for converting said second channel signal to a received signal, said demodulating means comprising a digital signal processor; and
delay equalizing means coupled to said first filter means for correcting phase error in said first output signal.

16. The modem of claim 15 further including analog-to-digital converting means coupled to said third filter means for converting said third channel to a digital signal and providing said signal to said digital signal processor.

* * * * *